United States Patent [19]
Camiade et al.

[11] Patent Number: 5,305,469
[45] Date of Patent: Apr. 19, 1994

[54] MODEM FOR TELECOMMUNICATION SYSTEM WITH A REFLECTION AMPLIFIER FUNCTION

[75] Inventors: Marc Camiade, Antony; Pierre Quentin, Paris; Pierre Savary, Les Ulis; Jean-Philippe Brandeau, Palaiseau, all of France

[73] Assignee: Thomson Composants Microondes, Puteaux, France

[21] Appl. No.: 792,911

[22] Filed: Nov. 15, 1991

[30] Foreign Application Priority Data

Nov. 16, 1990 [FR] France .................. 90 14292

[51] Int. Cl.$^5$ .................. H04B 1/44
[52] U.S. Cl. .................. 455/78; 455/73; 330/277; 330/293; 342/42; 342/51
[58] Field of Search .................. 307/264, 490, 571; 330/277, 293; 342/42, 51, 50; 455/73–74, 75, 78, 84, 88–89; 340/825.54; 329/344, 345, 369; 332/135, 146, 178; 375/8

[56] References Cited

U.S. PATENT DOCUMENTS

| | | | |
|---|---|---|---|
| 4,504,804 | 3/1985 | Chang et al. | 332/178 |
| 4,507,625 | 3/1985 | Lee et al. | 332/178 |
| 4,591,803 | 5/1986 | Saleh . | |
| 4,650,981 | 3/1987 | Foletta . | |
| 4,963,887 | 10/1990 | Kawashima et al. | 342/42 |
| 4,988,960 | 1/1991 | Tomisawa | 332/135 |
| 5,081,458 | 1/1992 | Meunier | 340/825.54 |
| 5,162,748 | 11/1992 | Katz | 330/277 |
| 5,164,719 | 11/1992 | Guena et al. | 342/51 |
| 5,164,732 | 11/1992 | Brockelsby et al. | 342/50 |
| 5,173,705 | 12/1992 | Camiade et al. | 342/42 |

FOREIGN PATENT DOCUMENTS

| | | |
|---|---|---|
| 0023275 | 1/9198 | European Pat. Off. . |
| 2624677 | 6/1989 | France . |
| WO8911701 | 11/1989 | PCT Int'l Appl. . |

Primary Examiner—Reinhard J. Eisenzopf
Assistant Examiner—Nguyen Vo
Attorney, Agent, or Firm—Oblon, Spivak, McClelland, Maier & Neustadt

[57] ABSTRACT

A modem which is to be included in a badge or mobile station, in a system for the exchange of data by microwaves with a fixed station or beacon. The modem has at least one transistor that works as a detector in reception or as an amplifier for the transmission of a reflection signal, according to gate bias voltages ($V_{gs0}$, $V_{gs1}$) that are applied to it, and drain currents ($I_{ds}$) that result therefrom. The transmission-reception switching is done by transistors that switch over loads, and hence currents, on an amplifier transistor, with amplitude or phase modulation. Such a modem may find particular application in short-distance telecommunication systems.

6 Claims, 3 Drawing Sheets

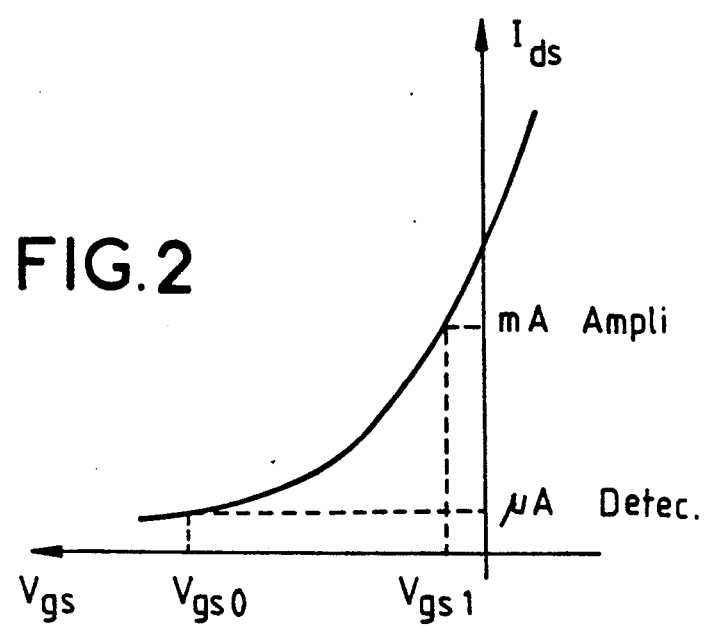
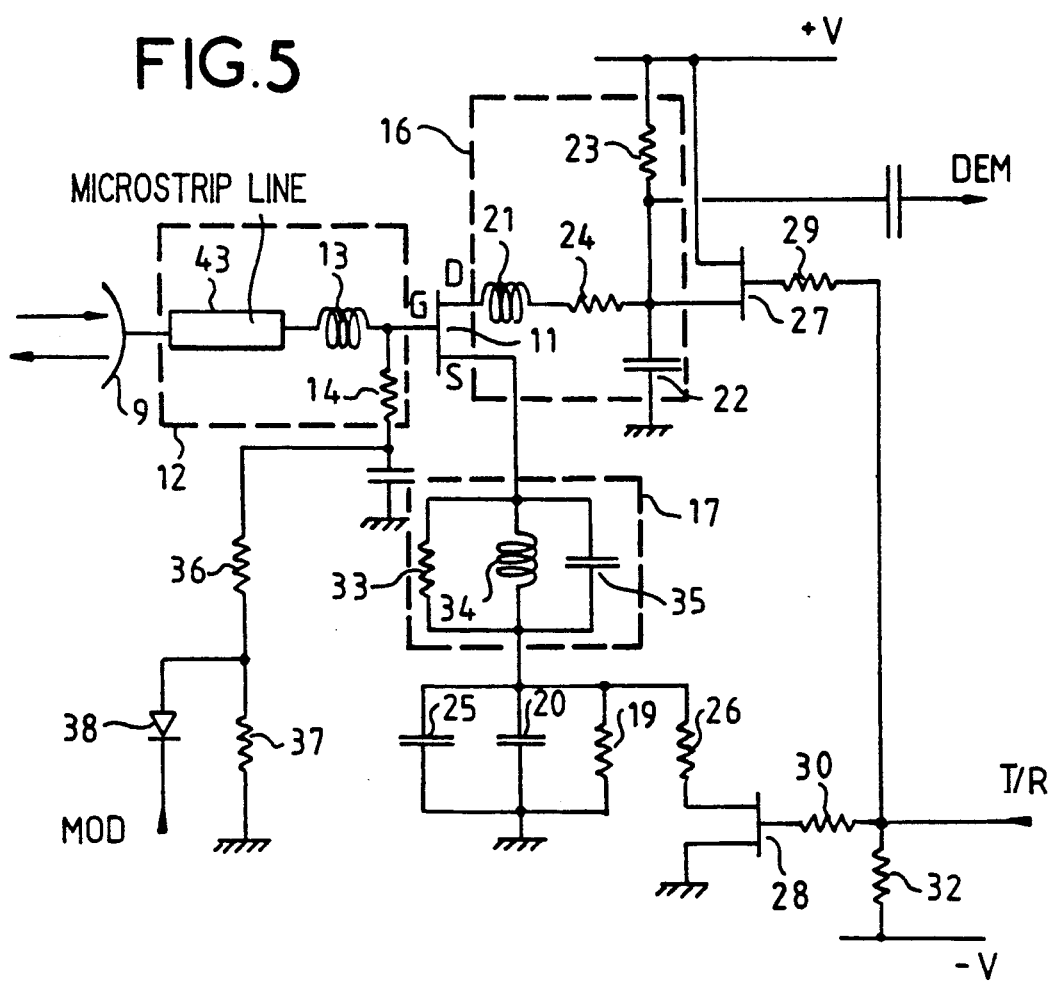

MODEM FOR TELECOMMUNICATION SYSTEM WITH A REFLECTION AMPLIFIER FUNCTION

BACKGROUND OF THE INVENTION

1. Field of the Invention

The present invention relates to a system of transmission by modulation-demodulation of a microwave, for two-way communication between a fixed station, called a beacon or reader, and a mobile station, called a badge or responder. More precisely, the invention relates to the active circuits of the modem (modulator-demodulator) of the portable badge. In order to be capable of transmitting, or more precisely, in order to be capable of responding to an interrogation sent by the fixed station, the badge has a circuit in which there is at least one reflection amplifier. Depending on the biases applied, the active element, namely a field-effect transistor, behaves either as a detector for reception or as a reflection amplifier for transmission.

This type of data exchange can be applied to the control of moving bodies, for example in the identification of wagons on a railroad, automobiles at a toll-gate or pedestrians at the entrance to a building. The mobile station or badge takes the form of a chip card, and it has to be extremely economical in energy for it is supplied by small cells known as "buttons".

2. Description of the Prior Art

The general diagram of a system for the exchange of data by microwave electromagnetic radiation, according to the prior art, is fairly simple and FIG. 1 which represents it enables its elements and the abbreviations used to be specified.

A mobile station or badge 1 includes a microwave part 3, an information processing part 4 and a supply 5. The exchanges between these two parts relate to the operation of modulation/demodulation and to the transmission/reception commands.

The fixed station or beacon 2 includes a microwave source, a microwave part 6, an information processing part 7 and a computer 8 which enables the management of all the radioelectrical exchanges carried out with the badges, by means of an antenna 9 for each badge and an antenna 10 for each beacon or reader.

The following values will be used:
- d = distance between the antennas 9 and 10,
- $G_1$ = gain of the antenna 10 of the reader 2
- $G_b$ = gain of the antenna 9 of the badge 1
- $P_{li}$ = power transmitted at the antenna of the reader 2
- $P_{lr}$ = power received by the antenna of the reader
- $P_{bi}$ = power transmitted at the antenna of the badge 1
- $P_{br}$ = power received by the antenna of the badge.

The modulations used in these systems are generally of the OOK (on-off keying) type in amplitude modulation or of the PSK (phase-shift keying) type in phase modulation or of the FSK (frequency shift keying) type in frequency modulation.

The working of the modem differs according to whether the beacon interrogates the badge or whether the badge responds to the beacon.

In the mode in which the badge 1 is interrogated by the reader 2, the reader 2 generates ($P_{li}$) a modulated microwave signal. The badge receives this signal ($P_{br}$) and demodulates it: this is a step that enables the activation of the badge that has been in the vigil state.

In the mode in which the badge 1 is responding to the reader 2, the reader generates a non-modulated microwave signal. The badge receives this signal, modulates it, i.e. loads it with the information on which it has been interrogated, and re-transmits a signal comprising, as the case may be, either losses or gain.

The electrical circuits used to perform the microwave function (modem) of the badge may be of different types.

The active circuits comprise the specific feature of giving power at the microwave frequencies of the carrier (of the order of 1 to 100 GHz). They therefore have gain at these frequencies, and use a biased transistor. These circuits are generally used during the retransmission of a signal from the badge towards the reader.

The semi-active circuits give no power at the microwave frequencies of the carrier, for which they have no gain, but nevertheless have gain at the demodulation frequencies of the order of 40 kHz to 1 MHz or several MHz, but not in the GHz range. These circuits are valuable for increasing the detection sensitivity of the badge.

There also exist passive circuits, using diodes, switches etc . . . which have no gain, whether at the microwave frequencies of the carrier (>1 GHz) or at the demodulation frequencies (<1 GHz). These circuits have low sensitivity for controlling the information processing circuit 4, at least in the case of a portable badge, since there is a problem of energy provided by the small "button" cells: these circuits therefore perform less well in detection.

It has been stated that the badge has only low energy sources and that it is necessary to achieve economy by limited consumption. This is why the most promising approach for communication in the badge-to-beacon direction consists in modulating the echo of a monotonous carrier wave transmitted by the beacon. It is the beacon that gives all the energy of the microwave beam, and the badge has to give only low energy, limited to the changes in the state of its circuits which cause the antenna to be matched or not matched in impedance to the frequency of the carrier (between 1 and 10 GHz). In other words, the badge modulates the echo that it sends back to the beacon, or reader.

SUMMARY OF THE INVENTION

The invention comprises modifying the standard circuit of a modem, comprising at least one active element which is a microwave transistor, so that the transistor works as a detector for a first state of biases (it is therefore in a state of vigil, and demodulates the signals transmitted by the beacon) then it works as a reflection amplifier for a second state of biases (it is therefore in an activated or response period and modulates the echo of the monotonous echo transmitted by the beacon).

Depending on the way in which the microwave reflection amplifier is used, it is possible to carry out amplitude modulation (OOK), phase modulation (PSK) or frequency modulation (PSK).

A microwave reflection amplifier is an amplifier than has a negative resistance obtained by placing a feedback loop between the input and the output of the transistor: it therefore has a gain in reflection, with a vector ratio modulus $|\bar{\Gamma}| > 1$, i.e.

$$\frac{P_{br}}{P_{bi}} > 1$$

More specifically, the invention relates to a modem for a microwave badge, in a system of data exchange by electromagnetic waves between, firstly, the antenna of a fixed station called a beacon, which transmits a pure carrier wave in a so-called transmission phase, and a modulated carrier wave in a so-called reception phase and, secondly, the antenna of at least one mobile station called a badge, comprising at least the modem and an information processing circuit, wherein the modem comprises at least one active circuit which is a reflection amplifier based on a field-effect transistor with gate-source feedback, the antenna matching gate impedance of which is matched in the reception phase (demodulation) and mismatched in the transmission phase (modulation).

BRIEF DESCRIPTION OF THE DRAWINGS

The invention shall be understood more clearly from the following more detailed description of its general organization and of a number of exemplary applications, based on the appended figures, of which:

FIG. 2 shows a curve $I_{ds}=f(V_{gs})$ of the transistor used in the badge according to the invention;

FIG. 5 shows a diagram of an embodiment of a modem with amplitude modulation by the gate voltage according to the invention;

MORE DETAILED DESCRIPTION

Figure 1:
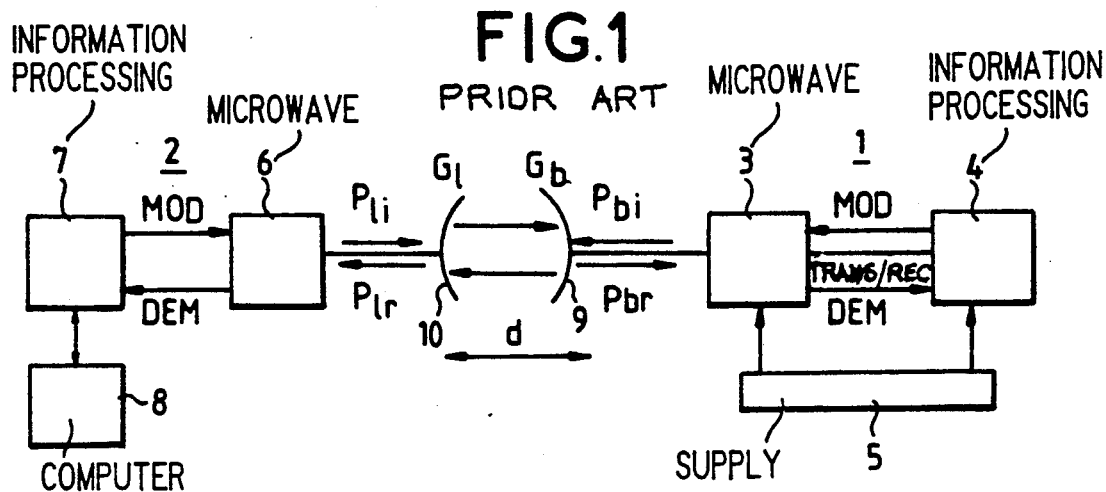
FIG. 1 shows a general simplified diagram of the exchange of data by microwave links. This figure, explained in the introduction relating to the prior art, remains valid for the invention.

The system of data exchange by microwaves comprises at least one fixed station and a large number of mobile stations: in order to simplify the explanations and the figures, only one mobile station or badge will be considered and, in this mobile station or badge, only the modem 3 which is the object of the invention will be represented. The information processing circuits 4, which combine a microprocessor, a logic circuit and a linear circuit lie outside the field of the invention.

The modem has different states depending on the way in which its active components, i.e. at least the microwave transistor and the transistors that switch over the bias voltages on the source, gate and drain of the microwave transistor, are biased.

FIG. 2 shows, as a reminder, a curve known per se of a drain current $I_{ds}$ as a function of the gate bias voltage $V_{gs}$ for a field-effect transistor. When the voltage $V_{gs}$ is at $V_{gs0}$, i.e. at midpoint of the characteristic curves of the transistor, the current $I_{ds}$ is equal to a few (2-10) microamperes, and the transistor works as a detector. When the gate bias $V_{gs}$ is at $V_{gs0}$, less negative, the transistor works as an amplifier, with a drain current of some milliamperes. However, the impedance of the antenna 9 of the badge should be greater than the input impedance of the transistor in terms of absolute value. If not, at $V_{gs1}$, the transistor would work as an oscillator.

In the demodulation function, i.e. in the state of vigil when the modem 3 of the badge receives an interrogation from the beacon 2, the microwave transistor is biased at $V_{gs0}$: the badge demodulates the modulated microwave transmitted by the beacon in using an active or passive circuit, according to the prior art.

By contrast, in the modulation function, i.e. in the activated state, when the modem 3 modulates the echo that it sends back to the beacon, the microwave reflection amplifier introduced by the invention comes into action in several ways depending on whether the modulation to be obtained is an amplitude, phase or frequency modulation, but in every case the modem behaves as an active circuit.

In amplitude modulation (OOK), there are two logic states that shall be called the "low state" and the "high state", these terms being simpler than "first logic state" and "second logic state". Naturally, this convention does not restrict the scope of the invention.

In the low state, the reflection amplifier does not come into action, the antenna 9 is matched in impedance R and no power is reflected by the antenna. The vector ratio is:

$$|\Gamma| = \frac{P_{br}}{P_{bi}} = 0$$

In the high state, the reflection amplifier comes into action: the antenna 9 connected to a reflection amplifier that has gain reflects a power greater than the power received: $|\overline{\Gamma}|>1$ and its impedance $R^-$ is negative, hence mismatched, but with gain in reflection.

In phase modulation, the reflection amplifier is connected in both logic states. However, a phase modulator, placed between the antenna and the amplifier, makes it possible to have two phase states with a power reflected by the antenna that is greater than the received power, hence the modulus $|\overline{\Gamma}|>1$. A first logic state, which is a low state for example, corresponds to a phase angle $\phi_1=0$ and the phase of the vector ratio is $\overline{\Gamma}|=2\phi_1$ (2 because there is a to-and-fro echo). A second logic state, which is a high state for example, corresponds to a phase angle $\phi_2 \neq \phi_1$ and the phase of the vector ratio is $\overline{\Gamma}|=2\phi_2$.

In frequency modulation, the reflection amplifier is also connected for the two logic states, each of these two states corresponding to a linear variation of the phase in time.

Figure 3:
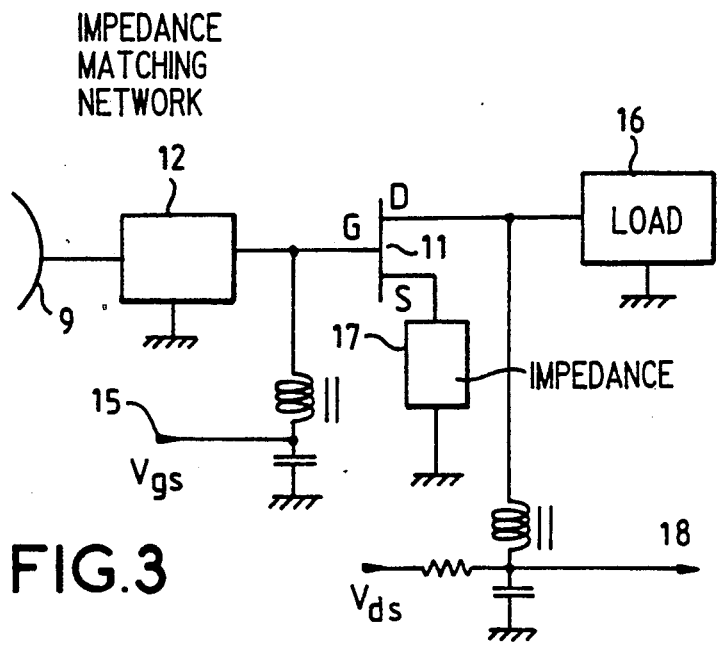
FIG. 3 shows a simplified electrical diagram of the badge according to the invention.

FIG. 3 shows a simplified block diagram of the modem of a badge according to the invention. This figure is a very general one, and shall be explained in detail in the following figures;

The modem 3 of a microwave badge has at least one field-effect transistor 11, capable of working in a range of 1 to 100 GHz. Its gate is connected to the antenna 9 through an impedance matching network 12, which can take different forms as shall be seen in the detailed examples. It is biased through a filter by a biasing voltage $V_{gs}$ applied to an input 11.

The drain is loaded by a load 16 and is biased through a filter by a bias voltage $V_{ds}$ applied to a load resistor. The demodulated output 18 of the modem is taken at the drain of this transistor 11.

In reception, the source impedance is taken into account but plays no role. Biased at $V_{gs0}$, close to its pinch-off voltage, it consumes power at a very low level (some microamperes), and this is the almost permanent state of the badge. This is a circuit that is active in detection, and the sensitivity that can be obtained is of the order of 60 mV for an incident power of $-30$ dBm to 10 GHz.

In transmission, the transistor is biased at $V_{gs1}$ and consumes a few milliamperes. For it to be a reflection amplifier, it is necessary to place a feedback loop between the input and the output of the transistor, so as to generate a negative resistance. For a field-effect transistor, this feedback loop may be an impedance 17 between the source and the ground. This impedance does not come into action in reception or, more precisely, the computation of the gate impedance 12 takes account of the source impedance 17, but it comes into action at transmission, to convert the demodulator transistor 11 into a reflection amplifier with negative resistance.

Figure 4:
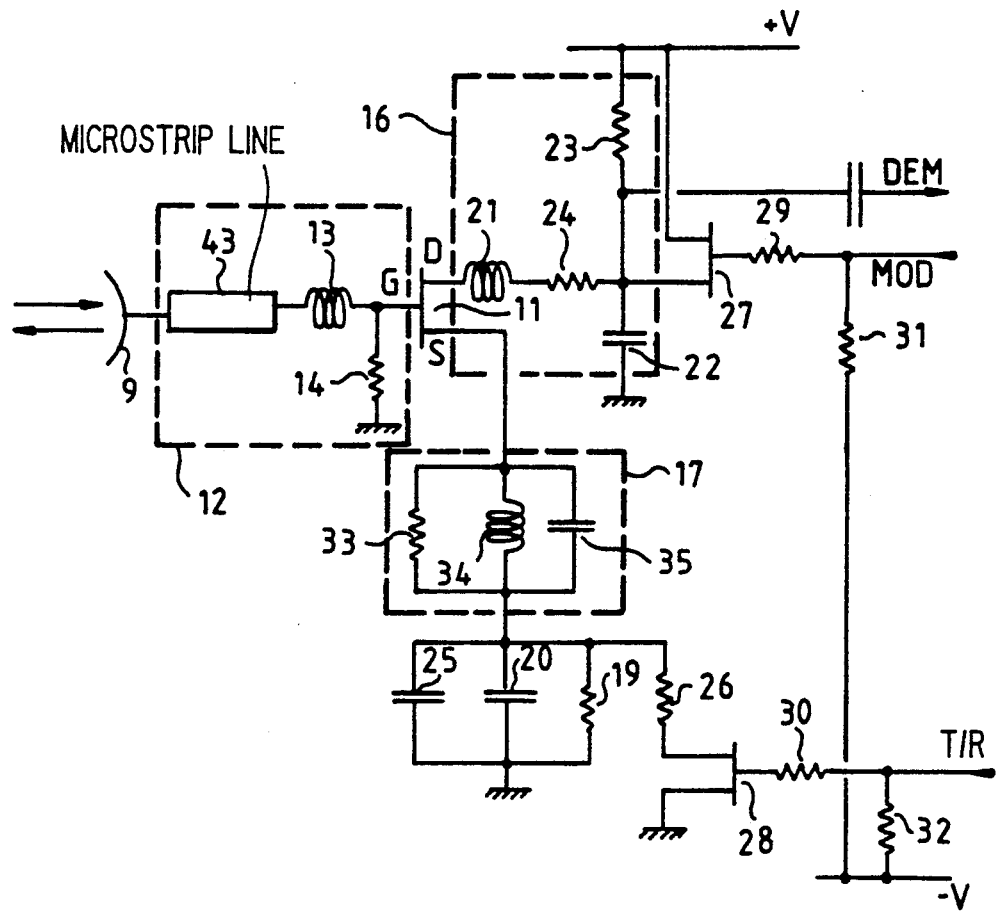
FIG. 4 shows a diagram of an embodiment of a modem with amplitude modulation by the drain voltage according to the invention.
Figure 6:
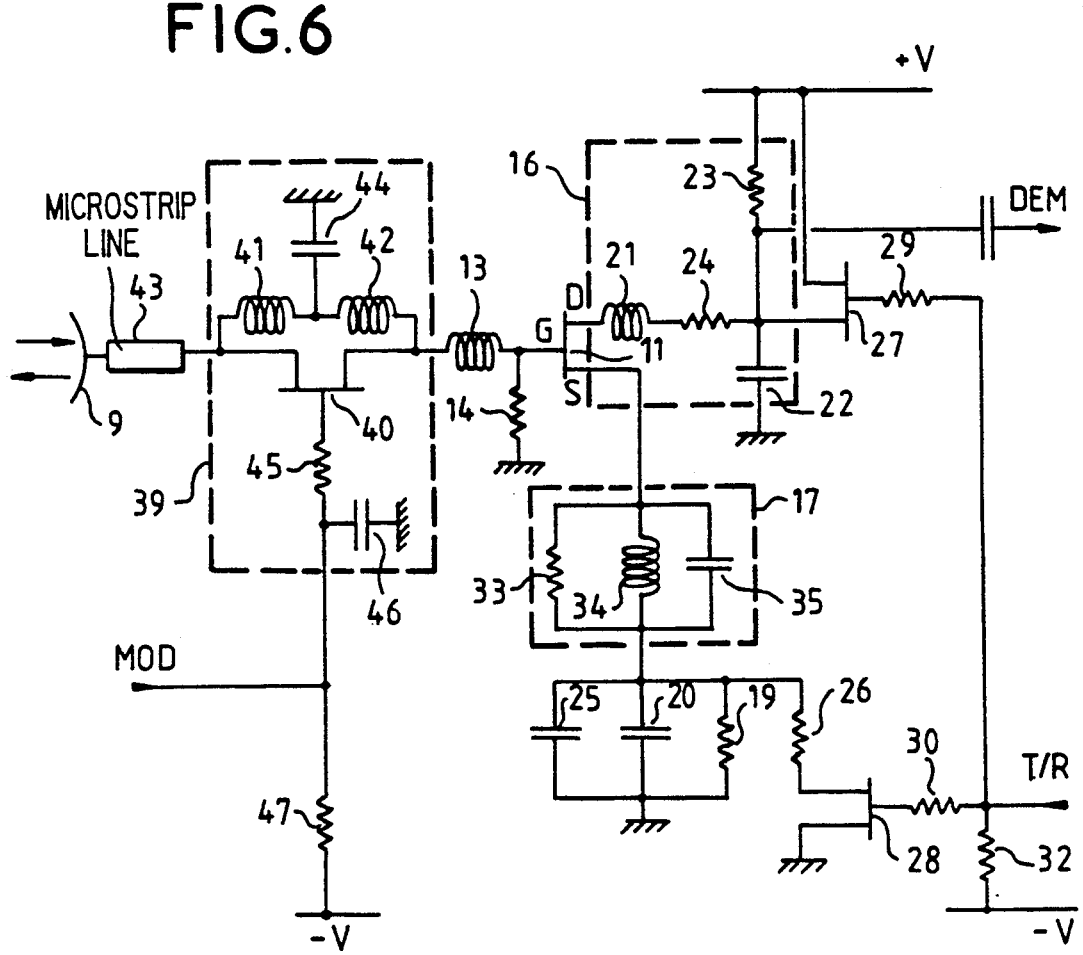
FIG. 6 shows a diagram of an embodiment of a modem with phase modulation according to the invention.

This general scheme is shown in detail in figures 4, 5 and 6 which are drawings of monolithic integrated circuits all having common elements. A badge modem has at least one field-effect transistor 11 with its different circuits.

On the gate, there is an impedance-matching circuit 12 formed by a microstrip line 43 for matching the antenna 9 to the integrated circuit, an inductor 13 and a grounded resistor 14.

On the drain, there is a load 16 constituted by an inductor 21, a drain resistor 24, a load resistor 23, with a resistance of the order of 100 kΩ, and a microwave frequencies decoupling capacitor 22.

On the source, there is a feedback circuit 17 formed by a resistor 33, an inductor 34 and a capacitor 35: this circuit 17 is decoupled from the ground by a microwave frequencies decoupling capacitor 25 and a demodulation frequencies decoupling capacitor 20. The resistor 19, which has a resistance of the order of 500 kΩ, constitutes a gate-source self-biasing circuit.

The modem is supplied between two voltages +V and −V (different from the ground) and its demodulated output DEM is taken beneath the load resistor 23 of the drain, and is decoupled by a capacitor.

The components of the gate impedance matching circuit 12 constitute a compromise between the different values that they should have in the three states of the transistor 11, and they take account of the feedback circuit 17 of the source.

FIG. 4 gives the example of an active modem with amplitude modulation by the drain voltage of the transistor 11.

In addition to the circuits that have just been described, which are common to the three FIGS. 4, 5 and 6, it has:
- a transistor 27, controlled by the modulation signal MOD, coming from the information processing circuit, through a load resistor 23 of the transistor 11. If there is no modulation signal, the resistor 31 places the gate of the transistor 27 at −V and turns it off;
- a transistor 28 controlled by the transmission/reception signal T/R through a current limiting resistor 30. When the transistor 28 is on, it places a resistor 26 with resistance of low value (about 1 kΩ) in parallel with the self-biasing resistor 19 which has a value of about 500 kΩ. If there is no transmission/reception signal T/R, the resistor 32 places the gate of the transistor 28 at −V and turns it off.

The modem works in the following way.

In the vigil state, the modulation input MOD and transmission/reception input T/R are at −V or under high impedance, and the transistor 11 is biased at $V_{gs0}$ and $V_{ds0}$. The transistor works as a detector, ready to demodulate a modulated microwave transmitted by the beacon 2.

When the modem is activated by the beacon, the T/R input is at +V and the transistor 11 is biased at $V_{gs1}$ and $V_{ds0}$. The resistor 19 (500 k) "short-circuited" by the resistor 26 (1 k) causes the feedback circuit 17 to come into action and will cause the transistor 11 to behave like an amplifier, on condition that it is supplied. There are two possibilities, depending on the bias of the modulation signal:
- if MOD = +V, the transistor 27 short-circuits the resistor 23, the drain of the transistor 11 is at +V and it behaves in reflection amplifier mode: $|\vec{\Gamma}| > 1$.
- if MOD = −V, the transistor 11 is no longer supplied at its drain, the biases $V_{gs0}$ and $V_{ds}$ fall to about zero and the transistor 11 behaves like an attenuator: $|\vec{\Gamma}| = 0$. Modulation has thus been done by the drain voltage, but the transistor 11 has three states: detector, amplifier and attenuator.

FIG. 5 shows an active modem with amplitude modulation by the gate voltage of the transistor 11.

By comparison with FIG. 4, it is seen that the switching transistors 27 and 28 and their associated resistors are mounted in the same way, except that the transmission/reception input T/R controls both switching transistors 27 and 28 simultaneously. One consequence thereof is that only one limiting resistor 32 is sufficient for the two transistors.

By contrast, the modulation input MOD is transferred to the gate of the transistor 11. The modulation signal MOD, through the attenuator 36+37 and the diode 38, is applied to the gate resistor 14.

In the vigil state, the working of the modem is exactly the same as in the previous case. When it is activated by the beacon, the badge sends out a positive signal T/R which turns on the two switching transistors 27 and 28. The modulation is obtained thus:
- if MOD = +V, the diode 38 turns this positive signal off, and the transistor 11 is biased at $V_{gs1}$ and $V_{ds0}$: it behaves like a feedback amplifier and $|\vec{\Gamma}| > 1$.
- if MOD = −V, the diode 38 is on and causes the bias voltage to fall to $V_{gs}$ to $V_{gs0}$. The transistor 11 is biased in detector mode, it has no gain, $|\vec{\Gamma}| = 0$, and its input impedance is matched.

The advantage of this circuit is that the transistor has only two states with respect to the matching of the antenna: the detector state or the amplifier state.

The two above examples show circuits designed for the amplitude modulation or OOK. FIG. 6 shows a circuit designed for the phase modulation, in transmission.

By comparison with FIG. 5, it is seen that the right-hand part of the figure, namely the source and drain circuits of the transistor 11, is unchanged, and that the two switching transistors 27 and 28 are controlled by the same T/R transmission/reception input.

The input circuit, between the antenna 9 and the gate of the transistor 11, has the same components as those of FIG. 4: a microstrip line 43 for impedance matching with the integrated circuit, an antenna matching inductor 13 and a gate resistor 14. However, between the two impedance matching elements 13 and 43, there is interposed a phase-shifter cell 39, by modifying the length of the line through a switching operation. A third switching transistor 40 is connected by its drain and source to the elements 13 and 43: if the transistor is on, it is equivalent to a short-circuit, and to a first length of the line of the gate of the transistor 11. If the transistor 40 is off, the phase-shifter cell constituted by the two inductors 41 and 42 and the capacitor 44 modifies the line length of the gate of the transistor 11.

The RC network formed by the resistor 45 and capacitor 46, connected to the gate of the third switching transistor 40, form part of the phase-shifter cell 39. The modulation signals MOD sent out by the information processing circuit 4 are applied between the resistor 45 and the capacitor 46.

Just as for the first and second switching transistors 27 and 28, the gate of the third switching transistor 40 is connected by a resistor 47 to the $-V$ supply: if no signal is applied to the gate, the transistor 40 is automatically off.

The modem of FIG. 6 works as follows.

In the vigil state, the inputs MOD and T/R are at $-V$ or under high impedance, and the three switching transistors 27, 28 and 40 are off. The transistor 11, biased at $V_{gs0}$ and $V_{ds0}$, is in detector mode: it is ready to demodulate a modulated microwave sent by the beacon 2.

When the model is activated by the beacon, the input T/R is at $+V$: the transistors 27 and 28, which are on, switch over the resistors 23 and 19, and the transistor 11, biased at $V_{gs1}$ and $V_{ds0}$, works as an amplifier. However, depending on whether the input MOD is at $+V$ or $-V$, the transistor 40 is on ($+V$) or off ($-V$) and changes the line length of the gate of the amplifier transistor 11. One of the two line lengths corresponds to a first phase state of the antenna 9, and the other length corresponds to a second phase state of the antenna, with reflection of the incident energy $P_{bi}$ by the reflection amplifier, by phase modulation.

The three configurations of applications that have been shown correspond to integrated circuit embodiments. It is clear to those skilled in the art, without going beyond the field of the invention, that these configurations can be achieved in hybrid circuit form. In this case, it is advantageous to replace the impedances capable of being integrated by impedances in the form of microstrip lines.

What is claimed is:

1. A modem for use in a system of data exchange by electromagnetic waves between a first antenna of a first fixed station, which transmits a pure carrier wave in a transmission phase and a modulated carrier wave in a reception phase, and a second antenna of at least one mobile station, the modem being located in the at least one mobile station and comprising:
   at least one active circuit comprising:
   a field-effect transistor;
   a high impedance load connected to a drain of the field effect transistor and that can be switched over to a low impedance load by a first switching transistor;
   a self-biasing circuit at a high impedance connected to a source of the field effect transistor, and that can be switched over to a low impedance by a second switching transistor; and
   a negative voltage source connected to gates of the first and second switching transistors;
   an information processing circuit further connected to the gates of the first and second switching transistors and to a gate of the field effect transistor, for outputting information signals on the gates of the field effect transistor and the first and second switching transistors.

2. The modem according to claim 1, wherein the modem operates as a detector to demodulate the modulated carrier wave transmitted by the fixed station when there are no said information signals output from the information processing circuit on the gates of the first and second switching transistors.

3. The modem according to claim 1, wherein the modem operates as a reflection amplifier by amplitude modulation to reflect signals transmitted by the fixed station when the information processing circuit outputs a modulation information signal on the gate of the field effect transistor and a transmission-reception information signal on the gates of the first and second switching transistors.

4. The modem according to claim 1, further comprising a phase-shifter connected to the gate of the field effect transistor, and which is operated to be switched over by means of a third switching transistor having a gate connected to the negative voltage source.

5. The modem according to claim 4, wherein the modem operates as a reflection amplifier and in phase modulation, when the information processing circuit outputs a transmission-reception information signal on the gates of the first and second switching transistors, and a modulation information signal on the gate of the third switching transistor.

6. A modem for use in a system of data exchange by electromagnetic waves between a first antenna of a first fixed station, which transmits a pure carrier wave in a transmission phase and a modulated carrier wave in a reception phase, and a second antenna of at least one mobile station, the modem being located in the at least one mobile station and comprising:
   at least one active circuit comprising:
   a field-effect transistor;
   a high impedance load connected to a drain of the field effect transistor and that can be switched over to a low impedance load by a first switching transistor;
   a self-biasing circuit at a high impedance connected to a source of the field effect transistor, and that can be switched over to a low impedance by a second switching transistor; and
   a negative voltage source connected to gates of the first and second switching transistors;
   an information processing circuit further connected to the gates of the first and second switching transistors for outputting information signals on the gates of the first and second switching transistors, wherein the modem operates as a reflection amplifier by amplitude modulation to reflect signals transmitted by the fixed station when the information processing circuit outputs a modulation information signal on the gate of the first switching transistor and a transmission-reception information signal on the gate of the second switching transistor.

* * * * *